Sept. 15, 1964   W. O. CARTIER ETAL   3,149,278
METHOD OF GEOPHYSICAL PROSPECTING BY MEASURING THE EARTH'S
MAGNETIC TIME TRANSIENTS SIMULTANEOUSLY
IN TWO DIFFERENT DIRECTIONS
Filed June 29, 1956   2 Sheets-Sheet 1

INVENTORS
GEORGE H. MCLAUGHLIN
WILLIAM O. CARTIER

ATTY

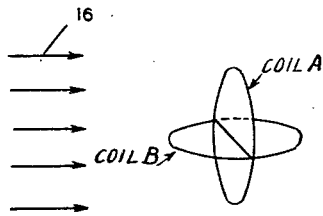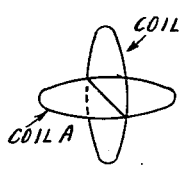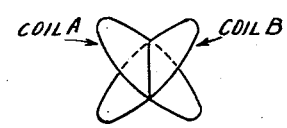
FIG. 4.    FIG. 8.    FIG. 12.
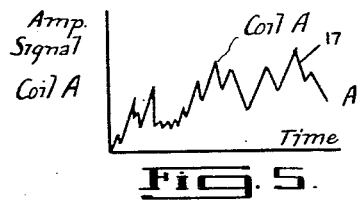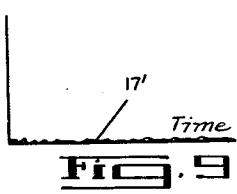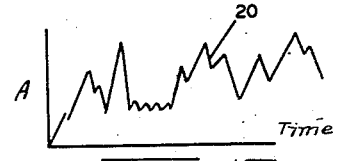
FIG. 5.    FIG. 9.    FIG. 13.
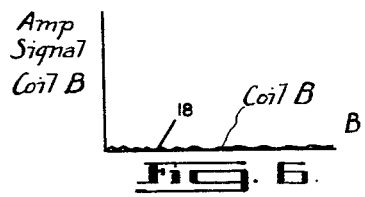
FIG. 6.    FIG. 10.    FIG. 14.
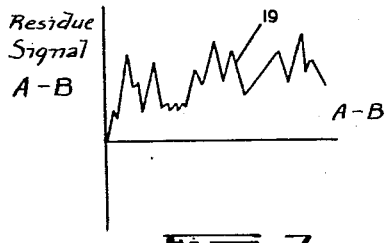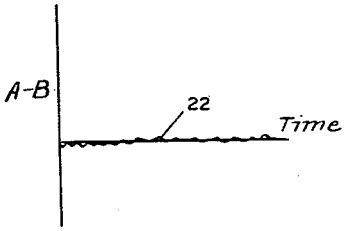
FIG. 7.    FIG. 11.    FIG. 15.
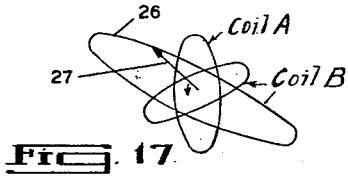
FIG. 17.
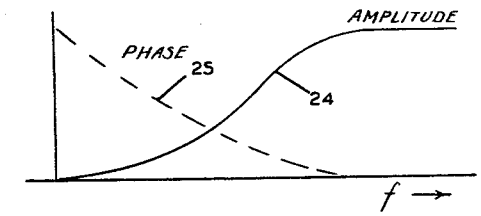
FIG. 16.
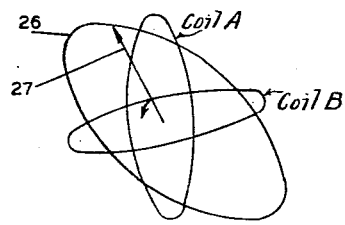
FIG. 18.
INVENTOR
GEORGE H. MCLAUGHLIN
WILLIAM O. CARTIER
ATTY.

3,149,278
Patented Sept. 15, 1964

1

3,149,278
METHOD OF GEOPHYSICAL PROSPECTING BY MEASURING THE EARTH'S MAGNETIC TIME TRANSIENTS SIMULTANEOUSLY IN TWO DIFFERENT DIRECTIONS
William O. Cartier and George H. McLaughlin, Toronto, Ontario, Canada, assignors, by mesne assignments, to Crossland Licensing Corporation Limited, Toronto, Ontario, Canada
Filed June 29, 1956, Ser. No. 594,809
13 Claims. (Cl. 324—7)

This invention relates to improvements in geophysical prospecting and equipment therefor.

In copending United States application Serial No. 440,406, filed June 30, 1954, now Patent No. 2,931,974 issued April 5, 1960, there is described a method of geophysical prospecting in which, for the first time, use is made of the time transients of the earth's magnetic field as an exploring energy source and time transients of a selected frequency or frequencies within the range of 1 to 20,000 c.p.s. are measured or detected to determine or isolate any variations in the selected transients which are independent of time caused by an influencing geophysical or ore body while the random variations which occur with time are ignored.

This invention is directed to a specific method and equipment, utilizing the principles disclosed in said copending application, which affords increased facility and accuracy in locating subterranean ore bodies which may comprise electrically conducting or magnetically permeable bodies.

Until the concept of the use of transient magnetic fields as the source of exploring energy it had always been considered necessary in the art of geophysical electromagnetic prospecting to employ a transmitter to transmit a magnetic field throughout the area to be investigated and to utilize a detector to detect the presence of conductive bodies by the angular distortion produced by the conductive bodies in the transmitted magnetic field. Such prior methods required the use of a heavy cumbersome magnetic transmitter, the size of which became very large for very low frequencies, i.e. under 300 cycles per second, and, of course, such methods are not effective for locating magnetic bodies.

Also, the depth sensitivity has been found to decrease at least as the square of the depth and for small bodies it may decrease as rapidly as the sixth power of the depth.

For satisfactory results, such prior methods have required accurate relative orientation of the transmitter and receiver or detector requiring the cutting of a grid of lines throughout the area and a surveying of each measuring station to an accuracy of approximately ten feet.

Another disadvantage of such prior methods is that they are subject to false readings from poor conductors such as wet clay when located near the transmitter coil. This is partly due to the extreme non-uniformity of the transmitted field which by the nature of the source is very intense near the transmitter coil and decreases as the cube of distance from the transmitter. In addition, although only the horizontal component of the transmitted field is useful in indicating a conductive body yet it is impossible to create a magnetic field without a vertical component of magnitude as large as the horizontal component especially near the transmitter source.

Moreover, the results of a survey with prior electromagnetic methods are very dependent on the location chosen for the transmitter coil in the area to be surveyed. Thus, if two conducting bodies lay adjacent in an area and the transmitter were located near the smaller, the results of the survey would tend to exaggerate the importance of the smaller and ignore the larger.

2

Further, operation at different frequencies requires a different transmitter for each frequency. Low frequency operation is virtually impossible due to the size and weight of the transmitting equipment required.

It has been discovered that when the time transients of the earth's magnetic field lying within the frequency range 1 to 20,000 c.p.s., that is, the low frequency geomagnetic fields, are utilized as the exporing energy source, the major limitations of the prior art electromagnetic methods disappear. There is no transmitter required and it has been found that the fields originate from sources which can be considered located at infinity relative to the area to be investigated.

According to the present invention, therefore, utilization is made of the magnetic time transients emanating from such infinitely distant sources as the exploring energy field to dispense with the necessity and limitation of creating an exploring electromagnetic field. Then the intensities of magnetic time transients of a selected frequency or frequencies within the range of approximately 1 to 20,000 c.p.s. are simultaneously measured at a point within the area to be investigated in two different directions and the intensities in the two directions compared to determine the existence of, or isolate, any systematic or ordered variations in the exploring transient magnetic field, caused by an influencing geophysical body, as distinguished from the random variations of the field with time.

More particularly according to the preferred form of the invention, the magnetic time transients are measured in two orthogonal directions by two receiver systems of substantially equal sensitivity and having substantially no coupling therebetween, and the signal outputs of the systems are cancelled one against the other, the degree of cancellation indicating the relative magnitude of the transient magnetic fields in such two orthogonal directions, which relative magnitude is independent of the variations in the actual magnitudes of the transient magnetic or T.M. field with time. In this way, any ordered non-random or time independent polarization anomaly of the T.M. fied is isolated from the random or time dependent effects. The isolation of such ordered or non-random anomaly of the T.M. field provides, by virtue of its very existence, an indication of the presence of an influencing geophysical body, and by isolating such T.M. field anomalies at a plurality of points and comparing them, a comprehensive assessment can be made as to the size, shape, extent and nature of the influencing geophysical or ore body.

The invention will be more fully understood from the following detailed description taken in conjunction with the accompanying drawings, in which:

FIGURE 4 is a diagrammatic illustration of the coil system of FIGURE 1 with one coil disposed vertically and the other coil disposed horizontally.

FIGURE 5 is a graph of the output signal from the vertical coil A with time.

FIGURE 6 is a graph of the output signal of the horizontal coil B with time.

FIGURE 7 is a graph of the resultant signal when the output from coil B is subtracted from the output of coil A.

FIGURES 8 to 11 are similar to FIGURES 4 to 7, respectively, but with the coils A and B rotated through 90 degrees.

FIGURES 12 to 15 are similar to FIGURES 4 to 7, respectively, but with the coils A and B rotated to a position 45 degrees from the position in FIGURE 4.

FIGURE 16 is a graph illustrating the degree of disturbance produced by conducting body on a magnetic field at different frequencies.

FIGURES 17 and 18 are diagrammatic illustrations illustrating the orientation of the coils A and B to provide maximum cancellation in the presence of elliptically polarized transient magnetic fields.

It has been discovered that there exist at the surface of the earth transient magnetic fields in which the transients may have a frequency up to 20,000 c.p.s. or higher.

That is, at any measuring station there exists a transient magnetic field, hereinafter called T.M. field, consisting of impulses, random in time, and in the absence of local conductor or magnetic bodies having substantially equal intensity in all directions on the surface of the earth.

While such impulses or time transients are random in incident direction, they have been found to be polarized so that they are substantially horizontal.

The amplitude of the field is to a first approximation inversely proportional to the frequency. In addition, amplitude at any one frequency is random with time. At any one frequency field impulses in the same azimuth will be identical in amplitude over considerable distances and will differ by only a phase shift.

Electrically conducting bodies or magnetic bodies in the earth's crust produce two types of local disturbance of the earth's T.M. fields, viz. a local change in the direction of the T.M. field and a local change in amplitude. The latter disturbance results in an increase in intensity near an electrically-conductive body or near a magnetic body. Field experiments have shown the increase in intensity can be as much as ten times.

The former type of disturbance results in a change in horizontal polarization of the T.M. fields. That is, the T.M. field is normally horizontal but in the vicinity of a conducting or magnetic body the T.M. field will tend to be polarized in a vertical direction.

In addition to producing a dip or introducing a vertical component in the T.M. field, a highly conducting body or magnetic body also imparts a directional polarization to the field polarizing the field in a direction perpendicular to the strike of the conducting zone.

Figure 3:
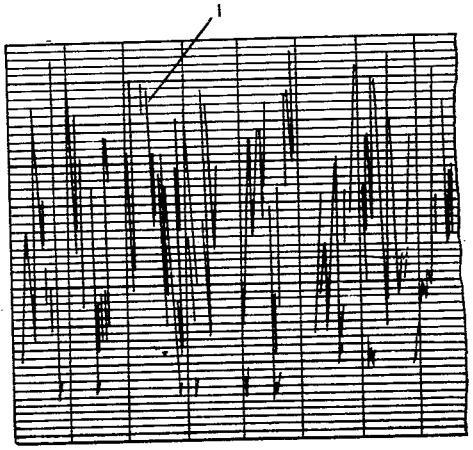
FIGURE 3 is a graph illustrating the variations in the time transients of the earth's magnetic field with time.

While the T.M. fields may be measured with a single coil to detect variations in intensity or vertical polarization due to the presence of an electrically-conductive body or a magnetic body, such measurements are difficult due the wildly fluctuating character of the fields as illustrated in FIGURE 3 in which 1 is a representative graph of the horizontal T.M. field intensity in the 500 c.p.s. range plotted against time. Thus, the random intensity peaks of the fluctuating field are a source of difficulty masking smaller changes in the general level of the T.M. field due to an influencing body and the sensitivity of the detection is limited.

Figure 1:
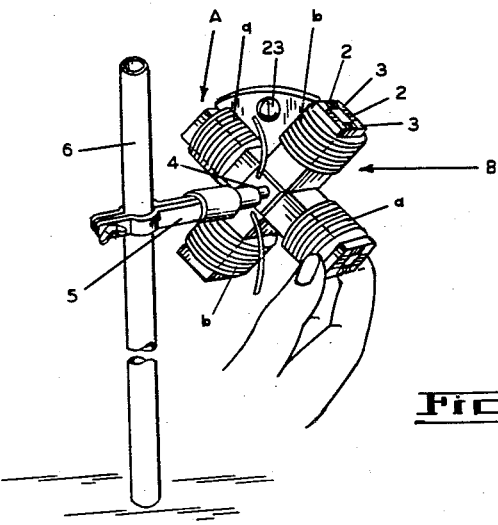
FIGURE 1 is a perspective view, partly broken away, of the detector unit employed for measurement of the low frequency transient magnetic fields in accordance with the invention.

According to the present invention, a pair of detector coils A and B arranged in a particular relative orientation, preferably orthogonal, as shown in FIGURE 1, are employed to greatly increase the sensitivity with which the anomalies in the concentration or polarization of the T.M. fields can be detected to located an influencing conducting or magnetic (geophysical) body as hereinafter more fully explained.

As shown in FIGURE 1, in the particular detector unit illustrated, each of the coils A and B is wound in two sections on a form constructed of iron laminations 2 and wooden spacers 3, the sections of coil A being indicated at $a$, and the sections of coil B being indicated at $b$. The coils on their forms are arranged in orthogonal relationship with each coil bisecting the other. The coils thus form a detector or receiver coil unit, and this unit is rotatably supported on a shaft 4, the axis of which is at right angles to the axes of the coils A and B, and intersects them at their point of bisection.

The shaft 4 is carried by a suitable clamp arm 5 mounted on a support 6 in the form of a rod or staff so that the shaft 4 can be adjusted up or down or along the support 6.

Figure 2:
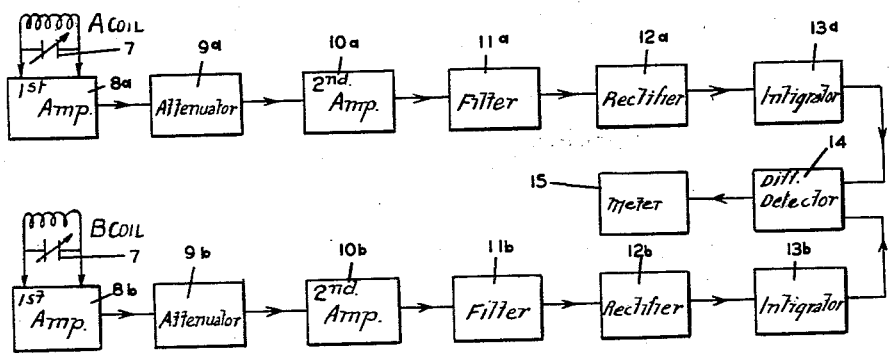
FIGURE 2 is a block diagram of the complete detector systems associated with the coils making up the detector unit of FIGURE 1.

Each of the coils A and B has associated with it a suitable tuning condenser 7, FIGURE 2, which may be variable to change the resonant frequency of the coil condenser combination. The signal output from the coil A is fed to a first amplifier 8a, and through the amplifier to an attenuator 9a, a second amplifier 10a to a filter 11a. The output of the filter is fed to a rectifier 12a and preferably through an integrating circuit 13a to a differential detector 14. The output from coil B is fed through corresponding units 8b to 13b, to the differential detector 14 and the residue signal is fed to a detecting device such as meter 15.

It is highly desirable that there should be as little coupling as possible between the two detector systems comprising coil A and the components 8a to 13a, and the coil B and components 8b to 13b, and to improve the decoupling between the two systems or channels, the coil A system may be arranged to pass signals of one frequency while the other system may be arranged to pass a slightly different frequency signal. For instance, coil A may be tuned to respond to T.M. signals of 450 cycles, and filter 11a arranged to have a corresponding frequency pass band. Coil B may be tuned to respond to T.M. signals of 500 cycles per second, and filter 11b arranged to have a corresponding frequency pass band.

To illustrate the functioning of the dual detector coils A and B, and the dual detector systems reference is to be had to FIGURES 4 to 15, inclusive. Assuming that the T.M. field is undisturbed and there is nolocal influence geophysical body present, the fields can be represented by horizontal arrows 16 which indicate the horizontal polarization of the field, which is random in direction. The receiver coil unit is oriented with the axes of the coils A and B in a vertical plane, and the axes of rotation 4 of the coils horizontal, then when coil A has its axis horizontal, coil B will have its axis vertical, as shown in FIGURE 4.

The response or signal generated in coil A by the horizontally polarized T.M. field is illustrated by the graph 17 of FIGURE 5, showing a change of amplitude with time in accordance with the time variations of the T.M. field. This signal, represented by the graph 17, is fed through the receiver system associated with coil A to the differentiating detector 14. The axis of coil B, however, is substantially perpendicular to the horizontally polarized T.M. field, and therefore, it will have substantially no response or signal developed therein, as illustrated by the graph 18 in FIGURE 6.

The differential detector 14 is arranged to substract the signal delivered from the detector system including the coil B from the detector system including the coil A, and the output of the differential detector is illustrated by the graph 19 in FIGURE 7. The meter 15 will thus show a fluctuating reading corresponding to the graph 19.

When the coils A and B are rotated through 90 degrees the reverse effects are obtained, as represented by the graphs 17', 18' and 19', the graph 19' being opposite in sign to the graph 19 on substraction of the signal arriving from coil B from the signal arriving from coil A, as will be apparent from FIGURES 9, 10 and 11. When the coils are rotated to the position of FIGURE 12, each coil has its axis disposed at 45 degrees to the horizontally polarized T.M. field, and the signals developed in the coils A and B and arriving at the differential detector 14 are substantially identical, as indicated by the graphs 20 and 21 of FIGURES 13 and 14, respectively. On substraction, therefore, the signals 20 and 21 cancel, leaving a small or substantially zero signal, as illustrated at 22 in FIGURE 15.

Thus, by rotating the coils A and B on the axis or shaft 4, and noting the angular orientation of the coils by means of a suitable clinometer 23 mounted on the receiver unit, the angle of polarization of the T.M. field can be ascertained. In the illustration of FIGURES 4 to 15, since the T.M. field is horizontally polarized, although random in direction, minimum signal at the meter 15 will occur with the coils in the position of FIGURE 12.

If the coils must be rotated to a different position as indicated by the clinometer 23 for minimum or zero signal at the meter 15, then the operator will know that the T.M. field has an angle of dip indicative of the presence of an influencing geophysical body. By recording the dip at a number of stations, the body may be located and delineated.

Although the angle of polarization can be determined with a single coil and detector, the dual coil and detector systems afford several extremely important advantages. With the dual coil system, sensitivity or accuracy of the measurement of the polarization angle is doubled. With a single coil the following relation applies:

$$\frac{ds}{d\phi} = \cos\theta$$

where $$\frac{ds}{d\phi}$$

=change of a signal output with rotation of a single coil from the null positon of the coil axis perpendicular to the T.M. field.

For the dual coil unit the relationship is:

$$\frac{ds}{d\phi} = 2\cos\phi$$

In addition, with a single coil, the null position can only be determined from the change in average signal as the coil is rotated. With the dual coil and receiver system at the null position, by virtue of the utilization of the cancellation of the signals in the differential detector, the degree of cancellation is independent of the variations in the signals since the signals are varying together. Thus, the signals will cancel whether such cancellation is occurring at a peak or at a low level point, and the system is substantially immune to adverse effects from the highly random nature of the T.M. field. Thus, in effect, the improvement in signal to noise ratio, when using the dual system as opposed to the single coil and detector system, is the difference between the average T.M. level and the peak T.M. level. In practice, this improvement is of the order of 2 to 5 times.

In other words, with the present invention, by comparing or measuring the relative intensity of the T.M. field measured simultaneously in two different directions, substantially eliminating the masking effects of the often extreme random fluctuations in intensity, the sensitivity of detection of any polarization of the T.M. field is increased from approximately 2 to 5 times.

It will be appreciated that if the coils A and B are rotated through 360 degrees four minima occur, but the ambiguity of whether the T.M. field is horizontal or vertical is resolved from the sense of the resultant signal A–B with the coils in the position FIGURE 4 or FIGURE 8.

The useful range of frequencies for the investigation of conductive and magnetic bodies is from a few cycles per second to a few thousand cycles per second, although in some instances it might be desirable to utilize as the exploring energy source a T.M. field having frequency down to approximately 1 cycle per second, or up to approximately 20,000 cycles per second.

The degree of disturbance produced by a conducting body on an existing magnetic field at different frequencies is illustrated by the diagram, FIGURE 16. As illustrated by the curve 24, at very low frequencies, the disturbance of a conducting body is small, but increasing with frequency. Also, as illustrated by the dotted curve 25, the effect of the conducting body is in quadrative phase with the initial field. At higher frequencies the effect of a conductor becomes large and no longer dependent on frequency and the effect is in phase with the initiating field. For highly conducting sulphide deposits the frequency at which maximum effect is obtained is only a few cycles per second; low conductivity bodies attain maximum response only at frequencies of several thousand cycles per second.

The disturbance produced by a magnetic body can be detected over a wide frequency range, but if the body is electrically conducting as well as magnetic, the magnetic and conducting influences oppose. Consequently, the magnetic effect is only measurable at very low frequencies where the conducting effect is small as shown in FIGURE 16 by curve 24.

It has been found that the amplitude of T.M. fields, at least over the desired frequency range, is approximately inversely porportional to frequency, and the induced voltage in the coils A and B from T.M. fields is proportional to the effective area of the coils and their number of turns and the frequency.

As the minimum useful signals detected by the coils A and B are those greater than the thermal agitation noise voltages developed in the coils which have an amplitude proportional to the square root of the resistive component of the coil impedance, which is inversely proportional to the weight of copper employed, the size and weight of the coils are selected to provide a suitable ratio of T.M. signal to thermal noise, for example, about 10 to 1. For instance, coils A and B, to operate over the frequency range of 20 to 2,000 cycles per second, may be designed to have the following characteristics:

Effective diameter—Approximately 2 ft.;
Weight—Approximately 10 lbs. of copper;
Tuned impedance—Approximately 500,000 ohms;
Bandwidth—Approximately 20 cycles.

With such a coil the T.M. signals normally measured are of the order of 5 microvolts and the thermal background noise is about one-half microvolt. The winding of the coils on the iron laminations 2 provides the effective diameter while decreasing the bulk of the coils. It will be understood that the actual design and construction of the coils may be readily varied as desired by a man skilled in the art.

Inasmuch as the output from the coil systems of coil A and coil B should be identical with the coils arranged in relation to the T.M. field illustrated in FIGURE 12, the relative sensitivities of the two systems must be kept constant. A 10 percent dissymetry in gains in the systems results in an angular error of 2½ degrees, and therefore the gains of the systems should be regularly checked.

As illustrated in FIGURE 16 by curve 25, the effect of a conducting body may not be in phase with the initiating T.M. field, and also to eliminate coupling, the detector system of coil A and that of coil B may not be tuned to exactly the same frequency. In order to obtain sharp nulls with the coils in the relationship of FIGURE 12 to the T.M. field, it is desirable that the signals from the coils be separately rectified as provided by the rectifiers 12a and 12b, and integrated over several cycles as provided by the integrating circuits 13a and 13b, before being subtracted in the differentating detector 14.

It will be understood that the amplifying systems of the two receiver systems of coil A and coil B should not have a larger internal noise than the thermal noise of the receiver coils. In this connection the impedance of each of the receiver or detector coils A and B should be chosen several times the noise equivalent resistance of its respective amplifying system, and the bandwidth of the amplifying system as determined by the filters 11a and 11b should not exceed the bandwidth of the coils A and B.

When measurements are carried out over a poor conductor, the disturbance from the conductor is out of phase with the initiating T.M. fields. In this case, the resultant field is elliptically polarized as illustrated diagrammatically at 26 in FIGURE 17. In this figure, arrow 27 represents the rotating resultant T.M. field and the ellipse 26 represents the locus of this resultant vector. With the dual coil arrangement of FIGURE 1 with coil A turned so that its plane is perpendicular to the major axis of the ellipse of polarization, a large signal (proportional to the major axis) will be induced in coil A. The difference in the signals from the coils A and B at the differential detector 14 will be large.

When the coil system is symmetrically located relative to the ellipse of polarization, the position illustrated in FIGURE 17, the same amplitude of signal but of different phase will be induced in the two coil systems of which the difference after rectification and integration will be essentially zero.

FIGURE 18 is similar to FIGURE 17, but illustrating the situation where the ellipse of polarization is approaching a circle of polarization. Under this condition, when coil A and coil B are symmetrically located relative to the polarization ellipse, the signals from the two systems will still cancel. However, even when coil A is rotated perpendicular to the major axis of the ellipse as before, the difference of the signals from the coils A and B in the differential detector will never become large.

In the extreme case of a circle of polarization, the signal difference A—B will everywhere be zero and no minimum signal position is detectable. Over such a conductor the frequency of operation of the coil systems must be increased to measure an angle of polarization and this increase can be effected by adjusting condensers 7.

In reference to FIGURES 17 and 18 it will be noted that where the initiating T.M. field is horizontal an in-phase conductor effect tilts the major axis of the ellipse out of the horizontal, and the out of phase component increases the minor axis of the ellipse of polarization. It will be understood, therefore, that the conductivity of a conducting body can be measured in terms of either the change in polarization angle with frequency or in terms of the magnitude of the minor axis of the ellipse of polarization at any one frequency. Thus the conductive character of the body can be ascertained.

In the preferred method of use of the dual coil system, the dual detector coils A and B are set up with the axis of rotation vertical, and in this position the coils are turned into a position to give minimum signals. The angle obtained in the event any minimum signals are observed is the strike angle of the polarized T.M. field. The fact that there is such a polarization in the horizontal plane is in itself an indication of the presence of an influencing geophysical body.

After the strike angle of the T.M. field is obtained, the dual coil unit is then rotated with the axis of rotation of the coils horizontal and perpendicular to the strike obtained. The coils are again rotated for minimum signal. The resulting angle is the dip of the T.M. field. In each of these measurements, the 90 degree ambiguity can be resolved by determining which direction either of the coils must be rotated to produce an increase in signal in the respective detector systems. The fact that a dip is measured again is a further indication of the presence of an influencing geophysical body, and the degree of dip will be indicative of its magnitude. To delineate the body, the above procedure is carried out at a number of points throughout the area, and the dip angles recorded from which the location of the body may be ascertained.

To distinguish between conductor and magnetic bodies, the effects at different frequencies can be observed. In this connection, it is to be noted that for conductor bodies the effects increase with frequency, while for magnetic bodies they decrease with frequency. Thus, when both magnetic and conducting materials occur together the magnetic effect will predominate at the low frequencies and the conducting effect at the higher frequencies.

It will be understood that a variation of the horizontal polarization of the T.M. field may be determined without first determining the strike of the T.M. field, and this step may be dispensed with if desired.

In addition to the method of use of the dual coil detector as described in detail above, the dual coil detector unit could be located relative to the T.M. fields as shown in FIGURE 4, and the relative gains of the two amplifier systems adjusted to cancel the individually detected fields, the change of relative gain being noted as an indication of a dipping T.M. field, or, similarly, the amplifying system could be set up to cancel for any relation of T.M. field and the whole detecting system moved over the surface of the earth, and any unbalance may serve to indicate a change in direction or dip of the T.M. field.

It will be understood that various other modifiations in the procedure in carrying out the search for electrically conducting and magnetically permeable bodies utilizing the principles herein disclosed, and various modifications in the details of the equipment may be made without departing from the spirit of the invention and scope of the appended claims.

What we claim as our invention is:

1. A method of geophysical prospecting comprising measuring at any instant at a point within an area to be investigated the relative intensity of magnetic time transients of at least approximately the same frequency selected within the range 1 to 20,000 c.p.s., measured simultaneously in two different directions, and, while maintaining the same relative relationship in the two directions of measurement repeating said relative intensity measurements in a plurality of directions to detect any variations in said relative intensity measurements with direction indicating polarization of such transients, repeating such measurements at other points within said area, and comparing any polarization of such transients at said points to determine the location of an influencing geophysical body.

2. A method of geophysical prospecting comprising simultaneously detecting magnetic time transients having at least approximately the same frequency selected within the range 1 to 20,000 c.p.s. in two substantially orthogonal directions at a point in space within an area to be investigated and measuring the instantaneous relative intensity of such detected transients, and, while maintaining the orthogonal relationship between the two directions of detection, repeating said relative intensity measurements in a plurality of directions to detect any variations in said relative intensity measurements with direction indicating polarization of such transients, repeating such measurements at other points within said area, and comparing any polarization of such transients at said points to determine the location of an influencing geophysical body.

3. A method of geophysical prospecting comprising utilizing as an exploring energy source time transients of the earth's magnetic field having frequencies within the range 1 to 20,000 c.p.s. measuring at any instant at a point in space within an area to be investigated the relative intensity of magnetic time transients of at least approximately the same frequency measured in two different directions bearing a fixed relationship to each other, and while maintaining the fixed relative relationship between said two different directions, repeating said relative intensity measurements in different directions to determine any anomalous polarization of the measured transients, indicating the presence of an influencing geophysical body.

4. A method as claimed in claim 3 in which said transient fields are at all times measured in two orthogonal directions.

5. A method of geophysical prospecting comprising utilizing as an exploring energy source time transients of the earth's magnetic field, having frequencies within the range 1 to 20,000 c.p.s., simultaneously measuring at a point in space within an area to be investigated the relative intensity of magnetic time transients of at least approximately the same frequency within said range detected in two substantially orthogonal tuned detector coils, repeating such relative intensity measurements in different directions while maintaining the orthogonal relation of said detector coils, comparing said different direction relative intensity measurements to determine any polarization of such measured transients, repeating such measurements at other points in space within said area, and comparing polarization directions of said measured transients at said points to locate an influencing geophysical body.

6. A method as claimed in claim 5 in which said orthogonal detector coils are rotated about a common axis both azimuthally with said common axis vertical and vertically with said common axis horizontal in determining polarization of the transients at said points.

7. A method of geophysical prospecting comprising utilizing as an exploring energy source the normally horizontal azimuthally random time transients of the earth's magnetic field, simultaneously measuring at a point in space within an area to be investigated the intensity of magnetic time transients of at least approximately the same frequency within the range 1 to 20,000 c.p.s. measured in two relatively fixed but spacially variable directions and determining any variations in the relative intensity of the transients measured in said relatively fixed directions as the directions of measurement are spacially varied, to determine any dip from the horizontal of the transients at such point.

8. A method of geophysical prospecting comprising utilizing as an exploring energy field the normally horizontally polarized time transients of the earth's magnetic field having frequencies within the range 1 to 20,000 c.p.s. by simultaneously measuring in space in substantially orthogonal directions, lying in a substantially vertical plane by means of two tuned detector systems of substantially equal sensitivity transients of at least approximately the same frequency within said range, cancelling the output of one detector system against the other and measuring the degree of cancellation to ascertain the instantaneous relative amplitudes of said transients in said substantially orthogonal directions, then repeating the measurement of the orthogonal transients in different directions in said vertical plane by shifting the detector systems until maximum cancellation is observed and recording the orientation of the detector systems in said vertical plane for such maximum cancellation.

9. A method of geophysical prospecting comprising utilizing as an exploring energy field the normally horizontally polarized time transients of the earth's magnetic field having frequencies within the range 1 to 20,000 c.p.s. by simultaneously measuring in space, in substantially orthogonal directions by means of two detector systems of substantially equal sensitivity comprising a pair of orthogonal tuned detector coils arranged in substantially the same vertical plane and mounted to rotate about a common substantially horizontal axis perpendicular to the coil axes, transients of at least approximately the same frequency within said frequency range, electrically cancelling the output of said coils and measuring the degree of cancellation, then rotating said coils on said substantially horizontal axis to obtain maximum cancellation, and recording the orientation of said coils in said vertical plane for maximum cancellation to determine any dip of said normally horizontally polarized transients caused by an influencing geophysical body.

10. A method as claimed in claim 9 in which said detector coils are first rotated about a substantially vertical axis while disposed in a substantially horizontal plane to detect any azimuthal polarization of said time transients, and thereafter said coils are rotated about said vertical axis with the coil axes in a common vertical plane aligned with any azimuthal direction of polarization of the transients.

11. A method as claimed in claim 9 in which the outputs from said coils are integrated before being cancelled to eliminate any phase variations therefrom.

12. A method of geophysical prospecting comprising rotating about a substantially horizontal axis a pair of substantially orthogonally arranged detector coils tuned to respond to time transients of the earth's magnetic field of at least substantially the same frequency within the frequency range 1 to 20,000 c.p.s. and maintained out of contact with the ground, electrically cancelling the output of said coils, and recording the angular position of said coils for minimum resultant signal after cancellation as an indication of the presence of an influencing geophysical body.

13. A method as claimed in claim 12 in which the rotation of the coils and the cancellation of their output is repeated with said coils tuned to different frequencies within said range, and the angular position of said coils for minimum resultant signal at said different frequencies is recorded.

References Cited in the file of this patent
UNITED STATES PATENTS

| | | |
|---|---|---|
| 1,708,386 | Gella | Apr. 9, 1929 |
| 2,359,894 | Brown | Oct. 10, 1944 |
| 2,485,931 | Slonczewski | Oct. 25, 1949 |
| 2,555,209 | Vacquier | May 29, 1951 |
| 2,664,542 | Lynn | Dec. 29, 1953 |
| 2,677,801 | Cagniard | May 4, 1954 |
| 2,766,426 | Wilhelm | Oct. 9, 1956 |
| 2,931,974 | McLaughlin et al. | Apr. 5, 1960 |